United States Patent [19]

Chen et al.

[11] 4,127,499
[45] Nov. 28, 1978

[54] SCINTILLATION COUNTING COMPOSITIONS

[75] Inventors: Tsang J. Chen; Raymond S. Miller; Edmond S. Perry, all of Rochester, N.Y.

[73] Assignee: Eastman Kodak Company, Rochester, N.Y.

[21] Appl. No.: 730,420

[22] Filed: Oct. 7, 1976

Related U.S. Application Data

[63] Continuation-in-part of Ser. No. 641,000, Dec. 15, 1975, abandoned, which is a continuation-in-part of Ser. No. 591,384, Jun. 30, 1975, abandoned.

[51] Int. Cl.$^2$ .............. G01T 1/20; G01J 1/58; C09K 11/00
[52] U.S. Cl. .............. 252/301.17; 250/483; 252/301.35; 260/29.6 TA; 260/29.6 SQ; 427/157
[58] Field of Search ............ 252/301.17, 301.35; 427/157; 250/483; 260/29.6 TA, 29.6 SQ; 96/82

[56] References Cited

U.S. PATENT DOCUMENTS

| | | | |
|---|---|---|---|
| 2,985,593 | 5/1961 | Broderick et al. | 252/301.2 |
| 3,010,908 | 11/1961 | Broderick et al. | 252/301.2 |
| 3,024,221 | 3/1962 | Le Fevre et al. | 260/79.3 |
| 3,150,101 | 9/1964 | Heimbuch | 252/301.2 |
| 3,356,616 | 12/1967 | Sandler et al. | 252/301.2 |
| 3,418,127 | 12/1968 | Millikan | 96/82 |
| 3,457,180 | 7/1969 | Kretz et al. | 252/301.2 |
| 3,513,102 | 5/1970 | Heidke | 252/301.2 |
| 3,896,138 | 7/1975 | Kreider | 252/301.2 |

OTHER PUBLICATIONS

D. Anderson, "Liquid Scintillation Counting Techniques As Applied to the Study of Glycol Loss from Latex Paint Films," J. Paint Technology, vol. 47, Mar. 1975, pp. 47–51.

S. Glasstone, "Source Book on Atomic Energy", pp. 140–142.

C. O. Muelhouse et al., "Two Liquid Scintillation Neutron Detectors", Nucleonics, Jan. 1953, pp. 44–48.

Primary Examiner—Aaron Weisstuch
Attorney, Agent, or Firm—Dana M. Schmidt

[57] ABSTRACT

Scintillation counting compositions are described, comprising polymeric particles derived from a latex and loaded with at least one uniformly dispersed hydrophobic fluor so as to permit detection of low-energy radiation.

Scintillation counting elements comprising a substrate coated with a dried layer of the above-described scintillation counting compositions are also described.

25 Claims, No Drawings

SCINTILLATION COUNTING COMPOSITIONS

RELATION TO OTHER APPLICATIONS

This application is a continuation-in-part application of U.S. Ser. No. 641,000 filed on Dec. 15, 1975, now abandoned which is a continuation-in-part application of U.S. Ser. No. 591,384 filed on June 30, 1975, now abandoned.

BACKGROUND OF THE INVENTION

1. Field of the Invention

The present invention relates to scintillation counting and more particularly to novel high efficiency scintillation counting compositions useful in "dry" counting elements.

2. State of the Prior Art

Scintillation counters are used for measuring the density or concentration of emissions from radioactive sources, such as beta particles, gamma radiation, etc. Such counters are well known in the art and the principles on which they operate are described, for example, in "Source Book on Atomic Energy" by Samuel Glasstone at pages 140–142, and "Two Liquid Scintillation Neutron Detectors," by Muelhouse and Thomas, *Nucleonics* 11, 44 (1953). Briefly, these counters detect and quantify emissions from scintillator compositions which comprise a solvent (liquid or solid) which "captures" the incoming radiation to be detected and measured, a primary fluor which responds to the incoming, "captured" radiation by fluorescing at a specified wavelength, and if desired, a secondary fluor or wave shifter which responds to the emissions of the primary fluor by fluorescing at a specified second wavelength.

There are three types of scintillator compositions. These are: (1) solid scintillators comprising a crystal of a solid hydrocarbon material; (2) liquid scintillators which comprise one or more suitable solid scintillators dissolved in a liquid solvent; and (3) so-called solid solution scintillators which comprise a solid scintillator in a solid polymeric solution. The compositions of this invention are most closely related to solid solution scintillators.

The most commonly used commercial solid solution scintillators comprise, e.g., a polystyrene block having fluors included therein. In use, samples are analyzed, for example, for $\beta$-particle emission, by dissolving the sample in a suitable solvent, for example, toluene; applying the solvent solution of sample to the solid solution scintillator block; and scintillation counting, i.e., quantifying the fluorescent emissions from the block. Unfortunately, such scintillators can only be used with very strong radiation emitters such as $^{60}$Co, $^{137}$Cs and UV excitation, with certain very specific organic solvent sample systems of weak $\beta$-emitters such as $^{14}$C, tritium or the like, or pure $\gamma$-emitters such as $^{125}$I or the like. The utility limitations of these systems are apparently due in large part to an inability to achieve the intimate contact between the emitter and the fluor or scintillator. Such intimate contact is required if these short range radiations are to affect the fluor. Thus, the efficiency of such counting systems is reduced. As a point of reference, the counting efficiencies of such prior art solid solution scintillators generally range below about 20% of theoretical maximum, apparently due to the lack of emitter-fluor intimacy. Liquid scintillator compositions on the other hand are capable of efficiencies above 35% and in some cases 100% of theoretical, most probably due to the intimate emitter-fluor contact possible in a liquid medium. Use of liquid scintillator compositions, however, involves a large number of handling problems well known to those skilled in the art.

The following patents further illustrate the above-noted developments in scintillation counting compositions.

U.S. Pat. No. 3,010,908, issued Nov. 28, 1961, discloses the use of dialkyl styrene polymers as the primary absorber in a solid solution scintillation counting composition. The maximum weight percent of fluors which can be carried as a solute in such a solvent system is disclosed to be about 5%.

U.S. Pat. Nos. 2,985,593 and 3,356,616, disclose styrene-derived monomers polymerized or copolymerized with vinyl or methacrylate monomers to form the solvent for a solid solution scintillation counting composition. The fluors are carried as solutes, and the fluor concentrations do not exceed about 3 weight percent.

U.S. Pat. No. 3,457,180, issued July 22, 1969, discloses as the solvent for a solid solution scintillator, copolymerized p-vinyltoluene and methyl methacrylate. The disclosed amount of fluor dissolved in such a solvent is less than 3 weight percent.

U.S. Pat. No. 3,150,101, describes the formation of scintillating ion exchange beads by the suspension-polymerization of polyvinyltoluene or polystyrene crosslinked with divinylbenzene, the monomers containing the fluors dissolved in them. Such beads, by virtue of their large size, and therefore their small surface area per unit of weight, do not have high counting efficiencies for low-energy radiation.

U.S. Pat. No. 3,513,102 discloses a fluorescent coating in which a fluor and a copolymer of an acrylate and styrene is dissolved in an organic solvent, and the solution is emulsified in an aqueous dispersion of a hydrophilic colloid. The copolymer is not derived from a latex, but is a solution polymer isolated, redissolved and blended by high-speed milling for dispersion in a gel binder.

U.S. Pat. No. 3,418,127, issued to A. G. Millikan Dec. 24, 1968, describes a technique for increasing the efficiency of direct electron recording compositions by incorporating increased levels of fluor into solid polymer solutions. Specifically the fluor is dispersed in an aqueous dispersion of monomer and then the monomer is emulsion polymerized. According to the teachings of this reference, maximum fluor concentrations on the order of 12–15% (col. 4, line 15) are achievable. Such compositions are formed into coatings as part of a composite photographic element suitable for the detection and recording, for example, of x-rays and other high energy emissions. No suggestion is made to use the coated element as a scintillation counter for, in particular, low energy emissions such as $\beta$-particles.

Other documents of interest are as follows:

Commonly owned U.S. patent application Ser. No. 506,919 filed by T. J. Chen on Sept. 17, 1974, now abandoned, entitled "Uniform, Efficient Distribution of Hydrophobic Materials Through Hydrophilic Colloid Layers, and Products Useful Therefor," refiled as Ser. No. 575,689 on May 8, 1975, describes a novel technique for incorporating unusually large concentrations of hydrophobic materials, for example, color forming couplers, into polymeric particles derived from a latex. Gelatin photographic elements are formed, for example, by a process which involves the step of (a) forming an aqueous dispersion by intermixing the hydrophobic material and an aqueous polymeric latex, optionally including gelatin in the dispersion;
(b) forming a wet layer by coating onto a suitable support the aqueous dispersion from step (a); and
(c) thereafter removing a substantial proportion of the water from the wet layer through which the hydrophobic material is dispersed. U.S. Ser. No. 575,689 has been refiled and divided into the following U.S. Applications: Ser. Nos. 744,680 filed Nov. 24, 1976; 778,182 filed Mar. 16, 1977 and 778,184 filed Mar. 16, 1977.

U.S. Pat. No. 3,024,221 issued Mar. 6, 1962 discloses certain new sulfo esters of α-methylene carboxylic acids. No mention is made of the compounds being useful in scintillation counting compositions.

OBJECTS OF THE INVENTION

It is an object of the invention to provide scintillation counting compositions capable of efficiently detecting low energy radioactive emissions, i.e., emissions having energy levels as low as about 0.01 Mev.

It is a related object of the invention to provide such a composition in a form that can be coated onto a support and dried.

Another object of the invention is to provide a process of measuring such low energy emissions by the use of a non-liquid coating.

Other objects and advantages will become apparent upon reference to the following Summary and Detailed Description of the Invention.

SUMMARY OF THE INVENTION

According to the present invention there are provided novel scintillation counting compositions, novel scintillation counting elements and processes for detecting and quantitatively determining low-energy radioactivity in samples for analysis. More specifically, there is provided a scintillation counting composition comprising loaded polymer particles derived from a latex, the particles being loaded with at least one hydrophobic fluor, the composition having a counting efficiency of at least about 23% when used as a substantially dry layer coated with a maximum wet thickness of 30 ml/100 cm$^2$ and tested with a water solution of tritium-labeled benzoic acid. The compositions can also be in the form of polymer latices which exhibit essentially no visible coagulation or settling when 250 ml of the latex containing from about 10 to about 20 weight percent polymeric particles dispersed in an aqueous continuous phase is slowly stirred at 25° C. into 250 ml of acetone over a 1 minute period at a uniform rate, and the blend is thereafter allowed to stand at 25° C. for about 10 minutes. The composition is particularly useful in a "dry" form, i.e., as a coating on a support, in which case a substantially non-quenching binder can be added to physical integrity.

The scintillator compositions of the instant invention contain fluor concentrations apparently unattainable in the prior art when in solid solution or "dry" form. Such relatively high fluor concentrations provide scintillation counting compositions demonstrating counting efficiencies for low energy emissions approaching the same magnitude as those attainable with the liquid scintillator compositions of the prior art (i.e., from about 23 to about 100%), thus permitting detection of sources emitting radiation at levels as low as about 0.01 Mev.

DETAILED DESCRIPTION OF THE INVENTION:

Although the following description is directed primarily to "dry" scintillator compositions, it is not so limited and applies to such scintillation compositions in whatever form found to be desirable.

The compositions of this invention concern a loadable latex, and specifically polymeric particles derived from the latex, and at least one fluor distributed within these particles, preferably in relatively high concentrations. Such a composition is particularly useful in the form of a "dried" residue, such as a coating on a support. In such "dried" form, stabilizing binders can be added. As used herein "dry" or "dried" refers to that state in which most, but not necessarily all, water or other solvent has been removed by evaporation or otherwise. "Substantially dry" refers to the removal of substantial amounts of water, and thus as used herein means the condition in which at least about 80% by weight of water has been removed.

The aforesaid U.S. patent application Ser. No. 506,919 of Chen is directed generally to a process for manufacturing a latex dispersion containing one or more hydrophobic materials uniformly dispersed therethrough. The application also describes a process for manufacturing improved polymeric latex compositions which are useful in the manufacture of a layered element. The polymeric latex compositions or "loaded" latex compositions described in the Chen application are polymeric latices in which the dispersed or discontinuous phase consists essentially of particles of a synthetic polymer having one or more hydrophobic compounds distributed among the polymeric particles. Distribution of the hydrophobic compounds is achieved by a process comprising blending together a "loadable" latex and a solution of the hydrophobic compound(s) dissolved in water-miscible organic solvent(s).

As used herein "distributed among the polymeric particles" means associated with the polymer particles both on the surface of the particles and in their interior. Some of the products of this invention are supports coated with at least one layer in which such particles of "loaded" latex are distributed. The term "loadable polymeric latex" or "loadable polymer latex" is intended, as used herein, to include those latex compositions which:

(a) provide polymeric particles which are compatible with the water-miscible solvent (i.e., they do not coagulate or precipitate when the latex is gradually blended into the solution of hydrophobe in the water-miscible organic solvent);
(b) preferably are compatible with binder solutions or dispersions, such as gelatin, in water (at 25° C.) containing as much as about 5 weight percent each of gelatin and latex "solids"; and
(c) when dispersed in water have a discontinuous phase which consists essentially of polymeric particles which will absorb or otherwise receive hydrophobic compounds forced out of solution in the water-miscible solvent.

A "loaded" latex then is a loadable latex in which a hydrophobe has been distributed according to the techniques discussed herein.

The scintillation counting compositions of this invention can comprise the latex formed in the manner described in the Chen application, except that the hydrophobe is the primary, and optionally, the secondary fluor appropriate to scintillation counters, instead of those disclosed in Chen.

Since the successful practice of the instant invention relies substantially on the preparation of materials and compositions as described in the above-noted Chen application, the salient features of that application will be described in greater detail.

The preferred polymeric latex compositions which form the basis for all aspects of this invention thus are manufactured by a process which comprises the step of gradually blending an aqueous loadable polymer latex into a solution of the hydrophobic fluor(s) dissolved in water-miscible organic solvent(s). The order of addition is of importance to prevent the latex from coagulating and to keep the fluor(s) from accumulating outside the latex particles in excessive amounts.

As described in the Chen application, as the aqueous latex is gradually introduced into the water-miscible solvent solution of hydrophobe, i.e., the fluor, the solution gradually becomes more hydrophilic or water-like in its character due to the incorporation of more and more water into the water-miscible solution. At some point (depending on the particular type and quantity of hydrophobe and the particular type of water-miscible solvent that is used) the solution becomes so hydrophilic that the hydrophobe can no longer remain dissolved therein, and the hydrophobe begins to change to an undissolved, dispersed state. By this time, there has been introduced into the solution a large number of uniformly dispersed, loadable polymeric latex particles along with the water. These particles evidently swell at least to some slight extent in the presence of the solvent, thereby becoming so receptive to the hydrophobic material that, when the hydrophobe is forced out of solution in some as yet unexplained manner, some hydrophobic material is preferentially absorbed into or is otherwise associated with the loadable polymeric latex particles. This is the first step in loading the particles.

Thus, the process described involves gradually increasing the hydrophilicity of a solution of a hydrophobe in a water-miscible solvent in the presence of uncoagulated, undissolved, loadable polymeric latex particles to a point at which substantially no hydrophobe remains dissolved in the water-miscible solvent phase. The increase in hydrophilicity is accomplished by adding water to the solution of hydrophobe in the water-miscible solvent, preferably in the form of an aqueous loadable polymeric latex.

Further loading is achieved, and completed, by evaporation of the water-miscible solvent.

One advantage of the above-described technique applied to this invention is that some of the thus-loaded latex compositions possess unique properties; for example, the hydrophobic fluor thereof appears in some cases to be more effective and/or more available for reception of the low energy emissions in the desired manner. This may be due to the fact that the process makes it possible to incorporate considerably larger amounts of fluor into the scintillation counting composition, i.e., into particles of the latex polymer, than was possible heretofore as evidenced by the relatively higher levels thereof which are incorporated. Scintillation counting compositions are produced which are particularly well suited to the measurement of low energy particles such as $\beta$-emissions produced by radioactive materials wherein the energy of emission is as low as about 0.01 Mev, the typical lower energy levels of tritium.

Water-Miscible Organic Solvents

The preferred water-miscible organic solvents are those which:

(a) can be dissolved in (i.e., are "miscible" with) distilled water at 20° C. to the extent of at least about 20 parts by volume of solvent in 80 parts by volume of water;

(b) have boiling points (at atmospheric pressure) above about 20° C.;

(c) do not detrimentally react chemically with the loadable polymer latexes which are useful in the practice of this invention;

(d) do not dissolve more than about 5 weight percent of such loadable polymer latices at 20° C.; and (e) act as solvents for the organic fluors described hereinafter at least to the extent of 0.02 weight percent at 20° C. for the secondary fluor and 1.0 weight percent for the primary fluor.

Examples of water-miscible solvents useful in the successful practice of the present invention include, solely by way of example, tetrahydrofuran, ethanol, methanol, acetone and the like.

LOADABLE POLYMERIC LATICES

Loadable polymer latices apparently include (but are not limited to) all of the polymeric latices having (i) a polymeric discontinuous phase (particles) which consists essentially of polymer polymerized from at least two ethenic monomers, from about 0 to about 10 weight percent of the polymer preferably being made from monomer containing a sulfonic acid or a sulfonate group, and (ii) an aqueous continuous phase; which polymeric latices do not coagulate or settle out when subjected to the following test:

Loadable Polymer Latex Test

At 25° C., slowly stir 250 ml of polymeric latex containing from about 10 to about 20 weight percent dispersed phase into an equal volume of acetone. The addition should take place over 1 minute at a steady, uniform rate, while the acetone is being stirred moderately. Discontinue the agitation and let the resulting blend stand at about 25° C. for 10 minutes. At the end of that time observe the blend. "Loadable polymer latices" are those which exhibit essentially no visible coagulation or settling out under these test conditions.

Preferred Loadable Polymeric Latices

Although any polymer which will meet the above "Loadable Polymer Test" is useful, polymer latices which are particularly useful in the successful practice of the present invention are those loadable latices wherein the dispersed phase comprises a polymer made of (a) from about 25 to about 100 weight percent of a styrene monomer having the formula

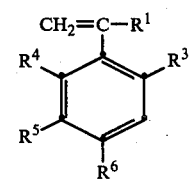

wherein $R^1$ is hydrogen or methyl; $R^3$, $R^4$ and $R^6$ are hydrogen or lower alkyl of 1 to 4 carbon atoms; $R^5$ is hydrogen or with $R^4$ constitutes the atoms necessary to complete a fused benzene ring; of which particularly useful examples are styrene, vinyltoluene, 2-vinylmesitylene and 1-vinylnaphthalene; and either or both of (b) from about 0 to about 95 weight percent of units derived from one or more ethenic monomers of the formula

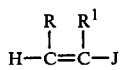

wherein R is hydrogen or alkyl containing 1 to 5 carbon atoms; $R^1$ is hydrogen or methyl; and J is hydrogen, halogen, methyl, cyano when $R^1$ is hydrogen, the group

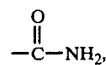

or the ester

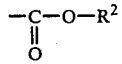

wherein $R^2$ is an aliphatic group containing from 1 to 6 carbon atoms; and (c) from about 0 to about 10 weight percent of a hydrophilic ethenic monomer containing a sulfonic acid group, or an ammonium or alkali metal salt thereof; said ethenic monomer preferably having a molecular weight of at most about 300.

In addition, other monomers of the class (a), (b) or (c), can be added, where copolymerization is possible. Alternatively, a monomer such as acrylamide can be added where additional hydrophilicity is required to absorb, for example, solutions having a high protein content.

It should be noted that the ratios of monomers set out herein are based upon the relative proportions of various monomers as they are charged into the polymerization reactor in a conventional free radical polymerization process. Products from such reactions may vary to some extent in the ratios derived from the charged monomers for various reasons which are well known to those skilled in the art of manufacturing synthetic polymeric latices. While "loadable" polymer latices can be made from two, three, four or even more different monomers, those which are preferred for use in the practice of this invention are generally comprised of two to four different types of monomers, depending upon the particular properties desired in the final products of the invention. As the manufacture of latices of this type is well-known, details of such procedures need not be described herein, except to point out that the preferred "loadable" polymer latices described above are generally prepared via free radical initiated reactions of monomers dispersed in an aqueous medium with one or more appropriate surfactants. See, for example, U.S. Pat. Nos. 2,914,499; 3,033,833; 3,547,899; and Canadian patent 704,778.

Monomers which are still further preferred for use in the manufacture of loadable polymer latices are those wherein (i) the acrylic ester monomer is selected from the group consisting of methyl, ethyl, propyl and n-butyl acrylates and methacrylates, and acrylonitrile, and (ii) the hydrophilic ethenic monomer, if used, is selected from those having a sulfonic acid group (or water soluble salt thereof) preferably attached to a terminal carbon atom such as, for example those having the following structure:

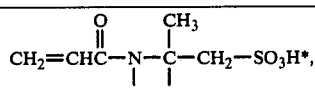
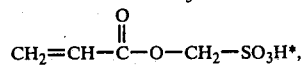
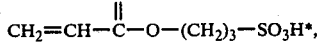
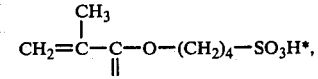
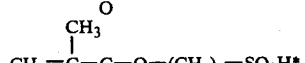
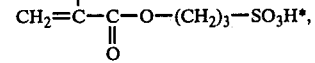
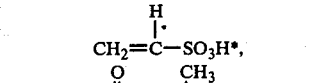
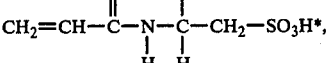
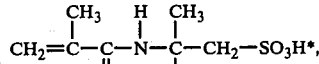
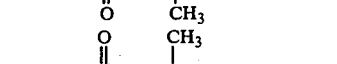
where R is H or $CH_3$.

* = in place of H can be an alkali metal cation, preferably $Na^+$ or $K^+$, or ammonium ion.

The generic formula for the preferred subclass of hydrophilic ethenic monomers containing the sulfonic acid group is

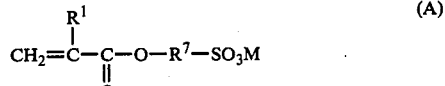

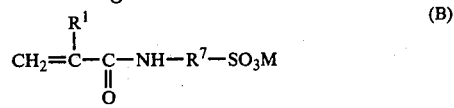

wherein $R^1$ is methyl or hydrogen; $R^7$ is methylene, ethylene, 2-methylethylene, trimethylene, tetramethylene, or 2,2-dimethylethylene; and M is ammonium, hydrogen or alkali metal cation. Certain variations within the formulas (A) and (B) may require increased amounts of binder when used as a coating as described hereinafter.

From the foregoing description it is evident that many combinations of monomers can be used in the manufacture of loadable synthetic polymeric latices in accordance with this invention. It must be pointed out, however, that many polymeric latices are not "loadable latices" as set out above. For this reason, it is recommended that, before a given latex is assumed to be "loadable", the latex be tested via the procedure set out above under the heading "Loadable Polymer Latex Test." The use of this test is also recommended as a control procedure because of the relatively low level of batch-to-batch reproducibility that sometimes occurs in the commercial manufacture of polymeric latices. A preferred method for manufacturing loadable latices is described below, preceding the Examples.

The dispersed polymeric particles comprising the discontinuous phase of the latex, formed in the manner described above, have an average diameter of from about 0.02 to about 0.2 microns. Thus, the latex can be considered a colloidal dispersion. The concentration of such a dispersion in a scintillation counting composition will vary depending, for example, upon the level of energy to be detected, etc. as is conventional. However, a preferred concentration range of latex particles is such that the polymer portion thereof, calculated apart from the fluor, gives a concentration of from about 0.03 g/cc to about 0.25 g/cc.

Fluors

Fluors useful in the successful practice of the present invention include any of the hydrocarbon fluors well-known in the scintillation counting art which are compatible with the loaded latex compositions described herein; i.e., are hydrophobic. As used in this application, a "hydrophobic fluor" is one which has substantially zero water solubility. Generally, suitable organic fluorescent compounds may be selected, for example, from those described as "organic fluors" and "organic scintillators" in *Organic Scintillation Detection,* E. Schram and R. Lombaert, Elsevier Publishing Co., 1963. Materials of this type include as the primary fluor the following: p-terphenyl (PTP), m-terphenyl, trans-stilbene, phenanthrene, indene, anthracene, 9,10-diphenyl anthracene, 2-phenyl-5-(4-biphenyl)-1,3,4-oxidiazole, 2,5-diphenyloxazole (PPO), p,p'-quaterphenyl, 1,1,4,4-tetraphenyl-1,3-butadiene, naphthalene, 2,5-di-(4-biphenylyl)-oxazole; 2-(1-naphthyl)-5-phenyloxazole, and 1,3,5-triaryl-2-pyrazolines including 1,3,5-triphenyl-2-pyrazoline, 1,3-diphenyl-5-p-acetoamidophenyl-2-pyrazoline, 1,3-diphenyl-5-p-hydroxyphenyl-2-pyrazoline, 1,5-diphenyl-2-p-methoxyphenyl-2-pyrazoline, 1-phenyl-3,5-di-p-methoxyphenyl-2-pyrazoline, 1,3-diphenyl-5-p-methoxyphenyl-2-pyrazoline, 1,3-diphenyl-5-p-diphenyl-2-pyrazoline, and compatible mixtures of any of the preceding.

Useful wavelength shifters (i.e., secondary fluors) are conventional compounds including 1,1,4,4-tetraphenyl-1,3-butadiene, p-bis(o-methystyryl)benzene, 1,4-bis-2-(4-methyl-5-phenyloxyazolyl)benzene, 2,2'-p-phenylenebis(5-phenyloxazole) (POPOP), diphenyl stilbene, and 1,3,5-triaryl-2-pyrazoline, the last being both a primary fluor and a wave shifter.

Preferred among these classes of materials are 2,5-diphenyloxazole (PPO) as the primary fluor and 2,2'-p-phenylenebis(5-phenyloxazole) (POPOP) as the secondary fluor or wave shifter. The concentration of fluor required to provide a useful latex, coated element or solid scintillator composition will, of course, vary depending upon the sensitivity of the particular fluor used as well as the type of particles to be measured with a particular fluor composition. Generally, however, the concentration of primary fluor will range from about 16.0 to about 40.0 weight percent and the concentration of secondary fluor or wavelength shifter from about 0.001 to about 0.2 weight percent, measured on a dry solids weight basis, in order to achieve useful results. Relatively higher concentration levels than those available in prior art solid scintillator compositions are obtainable using the technique of this invention. Specifically, the fluor can constitute at least as much as about 25% of the weight of the dry solids content of the composition.

Process of Manufacture of the Latex

With respect to the process of manufacturing the compositions and elements of the present invention, the order of addition of the loadable polymeric latex into the solution of fluor dissolved in water-miscible solvent is important. Reversing the order results in the coagulation and settling out of the latex or the accumulation of a large proportion of the fluor outside the latex particles in a much less desirable or less useful form.

In the manufacture of the loaded latex compositions of this invention, generally the relative volume of
 (a) loadable polymeric latex; and
 (b) solution of fluor material(s) (in water-miscible solvent) which are intermixed in the required manner, are not believed critical. Thus, so long as some loadable latex particles are present in the solution during that interval of time in which the fluor is forced out of solution (because of the increasing hydrophilicity of the solution, as described above), some loaded latex particles will be created. For example, one embodiment of the present generic process involves, stepwise,
 (a) the introduction of a quantity of loadable latex which is not sufficient to affect the hydrophilicity of the solution of fluor to the extent necessary to force the fluor out of solution; and
 (b) adding enough water to the resulting mixture to affect the desired transfer of fluor from the water-miscible solvent into the latex particles.

In this way, loaded latex compositions containing relatively larger proportions of fluor per particle can be made using a relatively dilute solution of fluor. Thus, it can be seen that there is more than one technique whereby the necessary increase in the hydrophilicity of the solution of fluor (during the period in which the fluor becomes insoluble in such solution) can be obtained. For this reason, when the phrase "at least sufficient water to cause the fluor to become insoluble in the solution" (with reference to the essential step of this process) is used herein, the "water" referred to in that phrase means not only water alone, but also the "aqueous" portion of a loadable aqueous polymeric latex as described hereinbefore, as well as water in the form of a solution of one or more dissolved salts and the like.

However, it is generally preferred that when the dispersed phase polymer "solids" of the loadable polymeric latex is above 10 weight percent, the relative amount of fluor solution that is blended with such latex should be between about 50 and about 200 parts by volume per 100 parts by volume of loadable polymeric latex; and still more preferably, about one part by volume of fluor solution per part by volume of loadable polymeric latex, particularly when the latex contains from about 12 to about 20 weight percent of polymeric particles. The actual optimum amount of time necessary to carry out the gradual mixing of (i) the latex and (ii)

the fluor solution in accordance with the present processes will vary in any given instance, depending upon such factors as
  (a) the identity of the polymeric latex, fluor and water-miscible solvent;
  (b) the relative concentrations of fluor and polymeric dispersed phase in the respective materials to be mixed, as well as;
  (c) the relative amounts of latex and fluor solution.
However, it is generally preferred that the gradual intermixing of loadable polymeric latex into the fluor solution take place over at least about 10 seconds, particularly in those instances in which the polymeric "solids" content of the loadable polymeric latex is above about 12 weight percent. Too fast intermixing has been found to result in formation of a second solid phase in the system and/or coagulation or settling of the latex particles. Gradual intermixing over at least about 20 seconds is still further preferred.

Generally, after a useful loaded latex composition, as described hereinbefore, has been formed initially, some or all of the water-miscible organic solvent can optionally be removed from the composition without harming the valuable utility of such loaded latex composition. Removal of water-miscible organic solvent can preferably be accomplished by evaporation under any of a wide variety of conditions (at temperatures below about 40° C., for example), preferably under reduced pressure. Preferably at least about half of the water-miscible solvent is removed from the initial compatible blend (of loadable polymeric latex/fluor/water-miscible solvent) to thereby form one of the preferred useful loaded latex compositions of the present invention. Such preferred useful loaded latex compositions retain their "latex" characteristics; that is, they have an aqueous continuous phase which optionally contains some of the water-miscible organic solvent (but preferably not more water-miscible solvent than about 30 weight percent of said continuous phase), and a dispersed phase comprising loaded latex particles in which the fluor is uniformly distributed. Removal of the organic solvent and/or some water from the initial blend of latex plus water-miscible solvent, of course, results in a composition having a higher "solids" content. Such latex compositions are useful as liquid scintillator compositions in a conventional fashion.

When it is desired to improve the stability of a loaded latex composition to inhibit the tendency of the latex to settle out gradually upon prolonged storage, the composition can be intermixed with an aqueous solution of a hydrophilic colloid such as gelatin. Such an embodiment is specifically preferred. A preferred minimum amount of hydrophilic colloid and/or a starch such as grafted starch in the resulting mixtures is about 1 weight percent based on the weight of the loaded latex composition, although more hydrophilic colloid can be used, if desired, to form a stabilized latex product.

The following is an illustrative, non-limiting example of the preparation of poly(n-butyl methacrylate-costyrene-co-2-acrylamido-2-methylpropane sulfonic acid in a charge weight ratio of 50:40:10, which provides suitable "loadable" polymeric particles as described above:

To a one-liter addition flask were added 200 g of n-butyl methacrylate, 160 g of styrene, and a solution consisting of 7.7 g of NaOH, 350 ml $H_2O$, 40 g of 2-acrylamido-2-methylpropane sulfonic acid, and 2 g of "Triton 770" (40%) which is an anionic sodium salt surfactant of an alkylaryl polyether sulfate in liquid form manufactured by Rohm and Haas. The mixture was stirred for 30 min. prior to the addition process. In a 250 ml addition funnel was added 200 ml $H_2O$ containing 2 g of $K_2S_2O_8$. Both the addition flask and the addition funnel were connected to a 3 liter reaction flask containing 800 ml $H_2O$ and 4 g of "Triton 770" (40%) maintained at 95° C. with stirring. To start the polymerization, 1.2 g of $Na_2S_2O_5$ was added to the reaction flask immediately followed by the addition of monomer mixture and $K_2S_2O_8$ solution. The period of addition was about 30 min. The polymerization was allowed to proceed for an additional 30 min. The latex was then cooled and dialyzed overnight to give a solids content of 13.8%.

Element

According to a preferred embodiment of the present invention, a stabilized loaded latex composition such as described above is coated directly upon a suitable support by conventional means and the solvent or suspension medium is driven off to provide a novel scintillation counting element. The support can be omitted if the coating is self-supporting, or if the composition is to be used in block form. In the latter case, the polymeric particles must be formed from the monomers described above which do not cause a substantial decrease in efficiency as thickness increases. If a support is to be used, it can be a conventional photographic support. Typical supports include transparent supports, such as film supports and glass supports as well as opaque supports, such as metal and photographic paper supports. The support can be either rigid or flexible. The most common supports for most applications are paper or film supports, such as poly(ethylene terephthalate) film. After coating the support, a substantial amount (generally at least about half, but preferably at least about 80 weight percent) of the water in the resulting coated wet layer is removed (preferably by evaporation) from said coated wet layer to form the desired, "substantially dry" coated substrate product. The dried layer thus contains particles derived from the latex, of which the polymer, when calculated apart from the fluor, preferably comprises a range of from about 1 to about 5 g per/100 $cm^2$.

Any coating technique involving the use of coating hoppers and/or other apparatus can be used to apply one or more layers of the compositions of the present invention to a support. Useful coating techniques and supports are described in the publications listed in Product Licensing Index, vol. 92, page 109, December, 1971. The coating coverage can be 5 to 40 millileters/100 $cm^2$, and preferably 10 to 30 ml/100 $cm^2$.

It has been found that as much as 25% of the dry coating weight, which includes the binder, can be the fluor, using the above-described methods. The fluor to polymer ratio can be as high as 4 to 3. Preferably, the latex polymer comprises between about 33 and about 80% of the dry coating weight.

Binders

If the novel scintillator composition of the present invention is to be coated on a support to provide a novel element as described hereinabove, a hydrophilic binder can be added to retain the individual particles of the latex residue in a relatively fixed physical relationship on the supporting substance and to assist in absorbing aqueous samples. In addition to providing a suitable medium or matrix for the residual latex particles, the binder preferably possesses certain other desirable characteristics. Among these are that the binder be substantially non-quenching, i.e., it should not absorb to any significant extent (i.e., more than about 1%) incoming emissions or inhibit to any significant extent the mobility of such particulate or wave form emissions in the scintillator composition or absorb in any inhibiting fashion the emissions of the fluor once excited.

In this regard, gelatin and starches which impart stability to the latex as just described also serve the binding function when used at concentrations ranging from about 3.0 to about 50 percent by weight of the latex or from about 2.0 to about 35 percent by dry weight of the coated scintillator composition. The increased viscosity provided by the binder makes it particularly useful for machine coating the counting composition. A grafted starch such as that available from General Mills has been found to be a particularly good binder which possesses each of the properties specified above. Other useful binders include poly(vinyl alcohol) and poly(acrylamide).

When a stabilizing colloid such as gelatin is also to be used as a binder for the dried residue of the loadable polymeric latex, the weight ratio of loaded latex residue to binder should range from about 1.0:0.75 to about 10.0:1.0 A particularly useful overall weight ratio of the solids components is 1 part fluor, 3 parts polymer, and 0.33 parts colloidal binder such as gelatin. A high ratio of residue to binder is desirable so that the polymeric particles are packed closely together. Too much binder may tend to cause detrimental quenching and a decrease in counting efficiency.

The process for preparing the loaded latex compositions, and for incorporating the resulting composition into a layer which contains at least one colloid, can be performed at temperatures ranging from about 0° C. to about 40° C. or more, care being necessary merely to prevent, or to encourage, as desired or necessary, the setting up or gelling of the coating compositions at the appropriate times.

It has been determined that the binder can be omitted entirely, particularly when the amount of acrylic ester monomer is increased to exceed the weight percent of the other monomers. Although the resulting coating prepared from such a composition may be somewhat tacky, the counting efficiency is still at least about 23%.

In those instances in which the coated latex is somewhat brittle, it is preferred that increased amounts of binder be used.

Element Use

In use, a radioactive sample is applied to the preferably "dry"-coated scintillation counting element. Such sample can be delivered in any suitable manner, such as by depositing an aqueous test sample on the surface of the composition, resulting in swelling thereof in response to the water of the sample. After permitting the sample to disperse throughout the portion of the coating ot be examined, the coating then is positioned under a fluorimeter of conventional design, such as a Packard Tri-Carb Liquid Scintillation Counter, to detect the amount of fluorescence which corresponds to the radiation of the test sample. It is the highly concentrated, uniform dispersion of fluors by the techniques described above which brings the sample now in the coating into very close proximity with the fluors. In this fashion it is possible to have a counting efficiency which is high enough to detect emission energies as low as about 0.01 Mev.

Optionally, the element plus sample can be dried to evaporate the water from the sample, to increase the counting efficiencies by 1 or 2%. However, the efficiency provided by the invention is so high that such a drying step is not critical or necessary.

EXAMPLES

The practice of the invention is further illustrated by the following non-exhaustive examples.

Ex. 1-3

To make a dispersion for coating, 3 g of PPO fluor and 15 mg of POPOP fluor were dissolved in 90 ml of tetrahydrofuran, then 90 g of poly(n-butyl methacrylate-co-styrene-co-2-acrylamido-2-methylpropane sulfonic acid) (50/40/10 weight ratio), hereinafter "Polymer 1", aqueous latex prepared as described above, containing 9 g of polymer, was added gradually, with stirring at about room temperature. The solvent was removed by evaporation in a rotary evaporator. After filtration, 25 g of 10% gelatin was added. The final dispersion contained 3% of PPO, $1.5 \times 10^{-2}\%$ of POPOP, 9% of Polymer 1 and 2.5% of gelatin, measured by weight of the total composition.

This dispersion was cast at a wet coverage of 10 ml/100 cm$^2$ on subbed poly(ethylene terephthalate) and evaporated to dryness. For the three examples, three strips 2 inches × ½ inch were cut and treated with 0.01 ml Benzoic Acid-$^3$H solution in water, Benzoic Acid-$^3$H solution in p-Dioxane, and Benzoic Acid-$^{14}$C in water, respectively. Each solution when coated had approximately 22,000 disintegrations/Min. The strips were evaporated to dryness, mounted in 20 ml glass counting vials, and counting in a Packard Tri-Carb Liquid Scintillation Counter Model 3380 at 12° C. The strips were aligned normal to the axis of the 2 photomultiplier tubes. The counting effciency was determined by comparing the detected emission against the theoretical disintegrations per minute. The results appear in Table I.

Table I

| Ex. | Sample Constituency | Counting Efficiency |
|---|---|---|
| 1 | $^3$H Benzoic Acid in Water | 31.8% |
| 2 | $^3$H Benzoic Acid in p-Dioxane | 25.6% |
| 3 | $^{14}$C Benzoic Acid in water | 89.5% |

Ex. 4-7

To determine the effect of the thickness of the coating, Examples 1-3 above were repeated, except that four coatings were made, two at 20 ml/100 cm$^2$ and two at 30 ml/100 cm$^2$, wet thickness, respectively, and only tritium-containing benzoic acid in water and tritium-containing benzoic acid in p-dioxane were used as the test samples. The results appearing in Table 2 indicate that the efficiency increased as the coating thickness increased.

Table 2

| Ex. | Wet Thickness | Test Sample | Counting Efficiency (%) |
|---|---|---|---|
| 4 | 20 | $^3$H Benzoic acid in H$_2$O | 32.9 |
| 5 | 30 | | 34.5 |
| 6 | 20 | $^3$H Benzoic acid in p-dioxane | — |

Table 2-continued

| Ex. | Wet Thickness | Test Sample | Counting Efficiency (%) |
|---|---|---|---|
| 7 | 30 | " | 30.0 |

Ex. 8–12

Coatings were prepared as in Ex. 1, except that the dispersion thickness was 30 ml/100 cm$^2$. For each of these 5 examples, 5 different isotopes identified in Table 3 were chosen as the test samples. The results are given in Table 3.

Table 3

| Ex. | Isotope | Energy (Mev.) | Counting Efficiency (%) |
|---|---|---|---|
| 8 | $^{14}$C in H$_2$O | 0.156($\beta$) | 89.5 |
| 9 | $^{14}$C in p-dioxane | " | 82.5 |
| 10 | $^{45}$Ca | 0.252($\beta$) | 100 |
| 11 | $^{36}$Cl | 0.714($\beta$) | 100 |
| 12 | $^{125}$I | 0.035($\gamma$) | 48 |

Ex. 13–19

The same procedures were followed as that of Ex. 1, except that 360 g of styrene was used without any butyl methacrylate monomer, to form as the polymer, hereinafter "Polymer 2", poly(styrene-co-2-acrylamido-2-methyl propane sulfonic acid) with a charge weight ratio of 90:10. The total solids content was 16.2%.

A dispersion of PPO and POPOP was made by using Polymer 2 in the procedure described in Ex. 1. The final dispersion contained 2% of PPO, 1 × 10$^{-2}$% of POPOP, 4% of Polymer 2, and 2% of gelatin. For each of the seven examples, coatings were made as in Ex. 1, except that the dispersion thicknesses and the test samples were varied as shown in Table 4. The counting efficiencies also appear in Table 4.

Table 4

| Ex. | Wet Dispersion Thickness (ml/100cm$^2$) | Test Sample | Counting Efficiency (%) |
|---|---|---|---|
| 13 | 2 | $^3$H Benzoic Acid in H$_2$O | 39.2 |
| 14 | 10 | " | 39.7 |
| 15 | 20 | " | 38.3 |
| 16 | 30 | " | 25.1 |
| 17 | 10 | $^3$H Benzoic acid in p-dioxane | 39.7 |
| 18 | 20 | " | 28.3 |
| 19 | 30 | " | 23.7 |

Ex. 20

It has been found that a coating prepared identically to that of Ex. 1, except with butyl acrylate as a fourth monomer in a charge weight ratio of 10:10:70:10, the 70 weight percent being styrene, to form poly(n-butyl acrylate-co-n-butyl methacrylate-co-styrene-co-2-acrylamide-2-methylpropane sulfonic acid), will also give a satisfactory scintillation counting composition with a counting efficiency at least as high as 40% when used to measure the radiation of tritium-containing benzoic acid in H$_2$O.

Ex. 21–25

To determine the effect of drying the sample and element prior to reading the fluorescence, five elements were prepared as in Ex. 20, and coated at 20 ml/100 cm$^2$. Upon each was deposited tritium-containing benzoic acid in H$_2$O. Drying times and conditions were varied as shown in Table 5, which illustrates the counting efficiencies.

Table 5
Effect of Drying

| Ex. | Drying Conditions | Counting Efficiency (%) |
|---|---|---|
| 21 | 1 hour at 65° C | 40.9 |
| 22 | 2 hours, ambient temperature | 39.8 |
| 23 | 4 hours, ambient Temperature | 41.3 |
| 24 | 5¼ hours, ambient temperature | 41.9 |
| 25 | 24 hours, ambient temperature | 40.9 |

Clearly, the effect of the moisture in the element is not enough to prevent a high counting efficiency, and can be accommodated by appropriate calibration.

Ex. 26–27

Two coatings of 30 ml/100 cm$^2$ wet thickness were prepared identically to that of Example 1, except with the sulfonic acid monomer omitted and the amount of styrene increased. In Example 26, the acrylic ester monomer was butyl methacrylate to form poly(n-butyl methacrylate-co-styrene) (35/65 weight ratio), while in Example 27 it was butyl acrylate to form poly(n-butyl acrylate-co-styrene) (35/65 weight ratio). These gave a satisfactory scintillation counting composition with a counting efficiency of about 38% when used to measure the radiation of tritium-containing benzoic acid in H$_2$O.

Ex. 28

A coating prepared as in Ex. 1 except with a monomer ratio of (55/40/5) and no binder, and a latex to fluor ratio of 3:1, gave a counting efficiency of 22.6% when used to measure the radiation of tritium-containing benzoic acid. The film so formed was tacky, but nevertheless gave successful counting results.

Ex. 29

A coating prepared as in Ex. 1 except with a monomer weight ratio of (30/60/10), and which had a weight ratio of polymer:gel binder:fluor of 3:3:1, gave a reduced counting efficiency of 17.92% — a value that is quite sufficient for high energy emissions.

Ex. 30

A coating prepared as in Ex. 29 except with a polymer: fluor:starch binder:gel binder ratio of 5:1:0.1:0.2 was prepared to demonstrate that a reduced amount of fluor concentration will also function satisfactorily. The counting efficiency when measuring tritium-containing benzoic acid in H$_2$O in a coating wet thickness of about 30 ml/100 cm$^2$ was 34.8%.

Ex. 31

A coating was prepared as in Ex. 16 except that the polymeric latex was changed so that 3-methacryloyloxy propane-1-sulfonic acid was substituted for 2-acrylamido-2-methyl propane sulfonic acid monomer. The final latex:fluor:gel binder ratio was 3:1:1. The counting efficiency, when measured as in Ex. 30, was 30.4%. In this example, the increased amount of binder was found to be useful for coating the otherwise brittle latex.

Ex. 32

A coating was prepared similar to that prepared in Ex. 1, except that the ratio of monomer was 65/30/5 n-butyl acrylate/styrene/ 2-acrylamido-2-methylpropane sulfonic acid, and the ratio of fluor:polymer:binder was 1:3:0.3 with one-third by weight of the binder being starch and the rest gelatin. When tested with $^3H$ benzoic acid in water as described in Ex. 1, the counting efficiency was 25.2%.

The invention has been defined in detail with particular reference to certain preferred embodiments thereof, but it will be understood that variations and modifications can be effected within the spirit and scope of the invention.

What is claimed is:

1. A scintillation counting composition comprising loaded polymeric particles derived from a latex, said particles
   (1) being loaded with at least one hydrophobic fluor comprising at least about 16% of the dry weight of the composition, and
   (2) having an average diameter no greater than about 0.2 micron.

2. The composition as defined in claim 1 wherein said particles are copolymerized from at least two monomer units, one of which is a styrene monomer unit having the formula

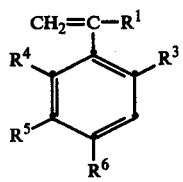

wherein $R^1$ is hydrogen or methyl; $R^3$, $R^4$ and $R^6$ are hydrogen or lower alkyl of 1 to 4 carbon atoms; $R^5$ is hydrogen or with $R^4$ constitutes the atoms necessary to complete a fused benzene ring.

3. The composition as defined in claim 2 wherein one of said monomer units is a sulfonic acid or a sulfonate monomer unit in an amount between about 0 and about 10 weight percent of the composition.

4. The composition as defined in claim 2 wherein one of said monomer units is an ethenic monomer having the formula $$\begin{array}{cc} R & R^1 \\ | & | \\ H-C=C-J \end{array}$$

wherein
R is hydrogen or alkyl containing 1 to 5 carbon atoms;
$R^1$ is hydrogen or methyl; and
J is hydrogen, halogen, methyl, or cyano when $R^1$ is hydrogen, or the ester

wherein $R^2$ is an aliphatic group containing from 1 to 6 carbon atoms.

5. The composition as defined in claim 1 wherein said fluor is selected from the group consisting of 2,5-diphenyloxazole; 2,2'-p-phenylenebis(5-phenyloxazole), p-bis-(o-methylstyryl)benzene, and 1,4-bis-2-(4-methyl-5-phenyloxazolyl)-benzene.

6. The composition as defined in claim 1 wherein two different fluors are present, one of which is a primary fluor and the other of which is a wave shifter.

7. A substantially dry scintillation counting composition comprising
   loaded polymeric particles derived from a latex, said particles
   (1) being loaded with at least one hydrophobic fluor in an amount comprising at least about 16% of the dry weight of the composition, and
   (2) having an average diameter no greater than about 0.2 micron;
   and in admixture, a binder present in an amount giving a weight ratio of said particles to said binder ranging from about 4:3 to about 10:1.

8. The counting composition as defined in claim 7, wherein said composition has a counting efficiency of at least about 18% when used as a substantially dry layer coated with a maximum wet thickness of 30 ml/100 $cm^2$ and tested with a water solution of tritium-labeled benzoic acid.

9. A scintillation counting composition, comprising
   (1) a polymer latex exhibiting essentially no visible coagulation or settling when 250 ml of the latex containing about 10 to about 20 weight percent synthetic polymeric particles dispersed discontinuously in an aqueous continuous phase is slowly stirred at 25° C. into 250 ml of acetone over a 1 minute period at a uniform rate, and the blend is thereafter allowed to stand at 25° C. for about 10 minutes, and
   (2) at least one hydrophobic fluor uniformly distributed among said particles.

10. The composition as defined in claim 9 wherein the weight ratio of said fluor to said synthetic polymer in said particles ranges from about 1 to 5 to about 4 to 3, respectively.

11. A composition as defined in claim 9, wherein said particles comprise a polymer containing from about 25 to about 100 weight percent of units of the monomer having the formula

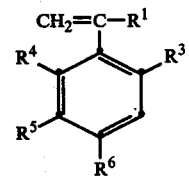

wherein $R^1$ is hydrogen or methyl; $R^3$, $R^4$ and $R^6$ are hydrogen or lower alkyl of 1 to 4 carbon atoms; $R^5$ is hydrogen or with $R^4$ constitutes the atoms necessary to complete a fused benzene ring.

12. The composition as defined in claim 11 wherein one of said monomer units is a sulfonic acid or a sulfonate in an amount no greater than about 10 weight percent.

13. The composition as defined in claim 12, and further including as an additional monomer, unit an ethenic monomer having the formula

wherein
R is hydrogen or alkyl containing 1 to 5 carbon atoms;
$R^1$ is hydrogen or methyl; and
J is hydrogen, halogen, methyl, or cyano when $R^1$ is hydrogen, or the ester

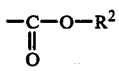

wherein $R^2$ is an aliphatic group containing from 1 to 6 carbon atoms.

14. The composition as defined in claim 9 wherein said composition is substantially dry and further including in admixture, a binder present in an amount giving a weight ratio of the dried latex residue to said binder ranging from about 4:3 to about 10:1.

15. The composition as defined in claim 9 wherein said fluor is selected from the group consisting of 2,5-diphenyloxazole; 2,2′-p-phenylenebis(5-phenyloxazole), p-bis-(o-methylstyryl)benzene, and 1,4-bis-2-(4-methyl-5-phenyloxazolyl)-benzene.

16. The composition as defined in claim 9 wherein two fluors are present, one of which is a primary fluor and the other of which is a wave shifter.

17. A scintillation counting composition comprising:
(1) the dried residue of an aqueous latex composition comprising a dispersed phase of solid particles of a copolymer comprising:
 (a) from about 0 to about 10 weight percent of a hydrophilic ethenic monomer unit containing a sulfonic acid group;
 (b) from about 0 to about 95 weight percent of one or more ethenic monomer units having the formula

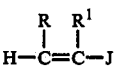

wherein
R is hydrogen or alkyl containing 1 to 5 carbon atoms;
$R^1$ is hydrogen or methyl; and
J is hydrogen, halogen, methyl, or cyano when $R^1$ is hydrogen, or the ester

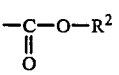

wherein $R^2$ is an aliphatic group containing from 1 to 6 carbon atoms;
 (c) from about 25 to about 100 weight percent of a styrene monomer unit having the formula

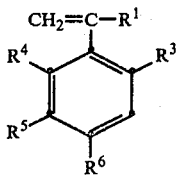

wherein $R^1$ is hydrogen or methyl; $R^3$, $R^4$ and $R^6$ are hydrogen or lower alkyl of 1 to 4 carbon atoms; $R^5$ is hydrogen or with $R^4$ constitutes the atoms necessary to complete a fused benzene ring; and
 (d) at least one hydrophobic fluor uniformly distributed among said particles in an amount comprising at least about 16% of the dry weight of the composition; and
(2) a binder present in an amount giving a weight ratio of said dried latex residue to said binder ranging from about 4:3 to about 10:1.

18. The composition as defined in claim 17 wherein said fluor is selected from the group consisting of 2,5-diphenyloxazole; 2,2′-p-phenylenebis(5-phenyloxazole), p-bis-(o-methylstyryl)benzene, and 1,4-bis-2-(4-methyl-5-phenyloxazolyl)benzene.

19. The composition as defined in claim 17 wherein two fluors are present, one of which is a primary fluor and the other of which is a secondary fluor.

20. A scintillation counting composition comprising a dispersed phase consisting essentially of solid particles of a synthetic polymer derived from a latex and loaded with at least one hydrophobic fluor distributed throughout said particles; the weight ratio of said fluor to said loaded synthetic polymer in said particles ranging from about 1 to 5 to about 4 to 3, respectively, and the average diameter of said particles being no greater than about 0.2 micron.

21. The composition as defined in claim 20 wherein said particles comprise a polymer containing from about 25 to about 100 weight percent of units of the monomer having the formula

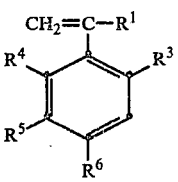

wherein $R^1$ is hydrogen or methyl; $R^3$, $R^4$ and $R^6$ are hydrogen or lower alkyl of 1 to 4 carbon atoms; $R^5$ is hydrogen or with $R^4$ constitutes the atoms necessary to complete a fused benzene ring.

22. The composition as defined in claim 20 wherein said composition is substantially dry, and further including in admixture, a substantially non-quenching binder, the weight ratio of said particles to said binder ranging from about 1.0:0.75 to about 10.0:1.0.

23. The composition as defined in claim 20 wherein said fluor is selected from the group consisting of 2,5-diphenyloxazole; 2,2′-p-phenylenebis(5-phenyloxazole), p-bis-(o-methylstyryl) benzene, and 1,4-bis-2-(4-methyl-5-phenyloxazolyl)benzene.

24. The composition as defined in claim 20 wherein two different fluors are present, one of which is a primary fluor and the other of which is a wavelength shifter.

25. A scintillation counting composition comprising:
(1) the dried residue of an aqueous latex composition comprising a dispersed phase of solid particles of a copolymer comprising:
(a) from about 0 to about 10 weight percent of a hydrophilic ethenic monomer unit containing a sulfonic acid group;
(b) from about 0 to about 95 weight percent of one or more ester monomer units having the structure

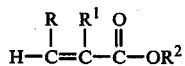

wherein
R is hydrogen or alkyl containing from 1 to about 5 carbon atoms,
$R^1$ is hydrogen or methyl; and
$R^2$ is an aliphatic group containing from 1 to 6 carbon atoms;

(c) from about 25 to about 100 weight percent of a styrene monomer unit having the formula

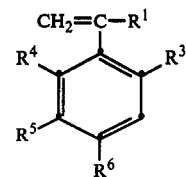

wherein $R^1$ is hydrogen or methyl; $R^3$, $R^4$ and $R^6$ are hydrogen or lower alkyl of 1 to 4 carbon atoms; $R^5$ is hydrogen or with $R^4$ constitutes the atoms necessary to complete a fused benzene ring; and
(d) at least one hydrophobic fluor uniformly distributed among said particles in an amount comprising at least about 16% of the dry weight of the composition; and
(2) a binder present in an amount giving a weight ratio of said dried latex residue to said binder ranging from about 4:3 to about 10:1.

* * * * *

UNITED STATES PATENT AND TRADEMARK OFFICE
CERTIFICATE OF CORRECTION

PATENT NO. : 4,127,499
DATED : November 28, 1978
INVENTOR(S) : T. J. Chen; R. S. Miller; E. S. Perry It is certified that error appears in the above-identified patent and that said Letters Patent are hereby corrected as shown below:

Column 2, line 63, before "describes" insert --now abandoned--.

Column 2, line 68, delete "step" and insert --steps--.

Column 3, line 57, delete "to" and insert --for--.

Column 9, line 37, delete "Elsevier" and insert --Elsvier--.

Column 11, line 59, delete "-costy-" and insert ---co-sty- -- .

Column 12, line 51, delete "millileters" and insert --milliliters--.

Column 13, line 60, delete "ot" and insert --to--.

Column 14, line 36, delete "counting" and insert --counted--; line 39, delete "effciency" and insert --efficiency--.

Column 18, line 67, after "monomer" delete the comma; insert a comma after "unit".

Signed and Sealed this

Eighth Day of May 1979

[SEAL]

Attest:

RUTH C. MASON
Attesting Officer

DONALD W. BANNER
Commissioner of Patents and Trademarks